July 8, 1947.  S. J. MIKINA  2,423,717

ARTIFICIAL MINNOW

Filed Dec. 22, 1945

INVENTOR
Stanley J. Mikina.
BY  A. R. Jerome
HIS ATTORNEY

Patented July 8, 1947

2,423,717

UNITED STATES PATENT OFFICE 2,423,717

ARTIFICIAL MINNOW

Stanley J. Mikina, Wilkinsburg, Pa.

Application December 22, 1945, Serial No. 636,570

5 Claims. (Cl. 43—46)

My invention relates to an artificial fish lure and particularly to an improved lure of the type shown in Letters Patent of the United States No. 2,256,813, issued to J. J. Mikina, on September 23, 1941.

An object of this invention is to provide an improved lure having a body which can be formed of molded plastic composition in one piece in a single operation.

A further object of this invention is to provide an improved lure having a body in which is secured a quantity of material which when immersed in water will generate gas which is released in such manner as to provide a realistic breathing appearance as the lure is drawn through the water.

Another object of the invention is to provide an improved lure in which the gas generating material may be quickly and easily replaced.

A further object of this invention is to provide an improved lure in which the gas generating material is carried in capsules which are sealed until put into use, and which can be quickly and easily secured in the body of the lure.

Another object of the invention is to provide an improved lure having a body in which is detachably secured a capsule containing a material which will attract fish to the lure.

A further object of the invention is to provide an improved lure containing a quantity of consumable fish attracting material and which is arranged and constructed so that the amount of such material remaining may be readily ascertained.

Another object of the invention is to provide a lure having a body to which is detachably secured a capsule containing a consumable fish attracting material, the lure body and capsule being constructed so that the capsule may be quickly and easily replaced and which is rigidly and effective secured to said body.

Other objects of the invention and features of novelty will be readily apparent from the following description taken in connection with the accompanying drawing.

I shall describe one form of lure embodying my invention and shall then point out the novel features thereof in claims.

Figure 1:
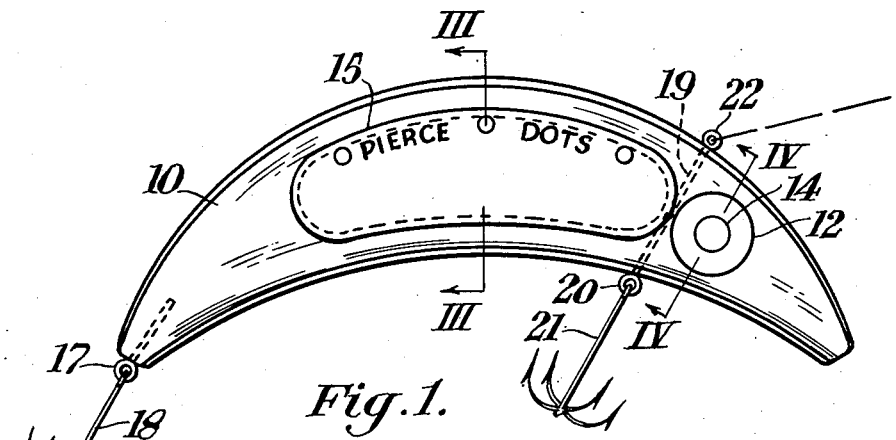
Fig. 1 is a side view of a lure embodying my invention.
Figure 2:
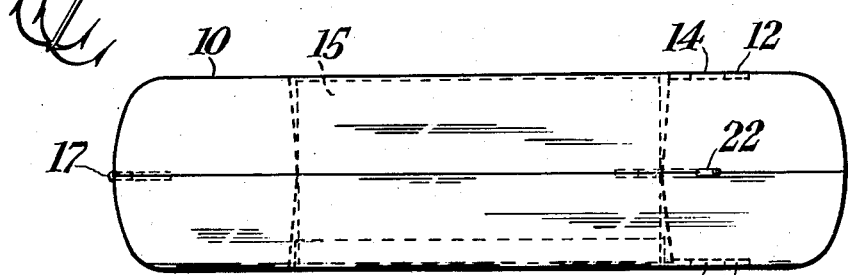
Fig. 2 is a top plan view of the lure shown in Fig. 1.

Referring to Fig. 1 of the drawings, it will be seen that the body 10 of the lure comprises a single member which, as viewed from the side, is generally crescent-shaped, being curved from front to rear and being of larger cross-section in the mid-portion than adjacent the ends, while the two ends of the body are substantially symmetrical. Referring to Fig. 2, it will be seen that this member, as viewed from the top, is of substantially uniform thickness throughout, except that the ends are rounded.

The body member 10 is preferably molded from a substantially rigid plastic composition and may be entirely of one suitable color or may be of a combination of two or more colors. Shallow circular recesses are formed on the sides of the body adjacent the front and in each of these recesses is mounted a ring or washer 12 and a disc 14 to simulate the eye of a fish. The washer 12 may be formed of a sheet plastic material of suitable color such as pink, blue, or green, while the disc 14 may be formed of a material of a contrasting color, such as black.

Figure 3:
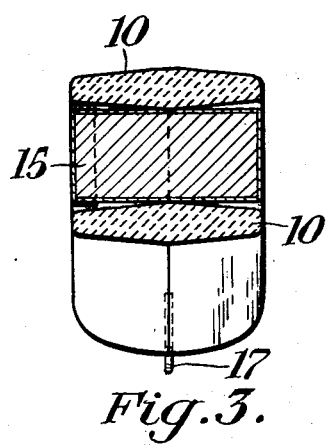
Fig. 3 is a sectional view taken along the line III—III of Fig. 1.
Figure 4:
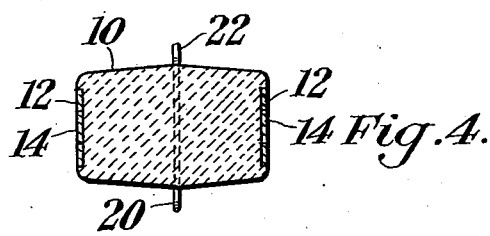
Fig. 4 is a sectional view taken along the line IV—IV of Fig. 1.

The body 10 has a centrally located arcuate opening which extends through the body and in which is mounted a capsule 15. As is best shown in Fig. 3, the sides of this cavity slope towards each other from the faces of the body so that the cavity is slightly smaller in size adjacent the center line of the body than adjacent the faces of the body. In addition, as is clear from Figs. 3 and 4, the top and bottom surfaces of the body 10 slope away from each other from the side faces of the body towards the center line of the body. These sloping surfaces on the top and bottom surfaces of the body and on the walls of the opening in the body facilitate molding of the body, while the sloping surfaces on the walls of the opening in the body also assist in securing the capsule 15 in position, as hereinafter explained.

A screw eye 17 is secured in the rear or tail portion of the body, and a gang hook 18 is attached to this screw eye. A hole extends diagonally through the body 10 slightly forward of the opening for the capsule 15, while a wire 19 extends through this hole. An eye 20 is formed on the lower end of this wire and a gang hook 21 is secured to this eye, while an eye 22 is formed on the upper end of the wire 19 and is adapted to receive the fish line.

Figure 6:
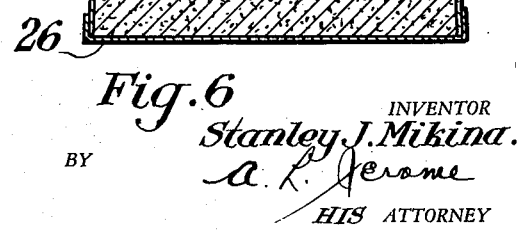
Fig. 6 is a sectional view taken along the line VI—VI of Fig. 5.
Figure 5:
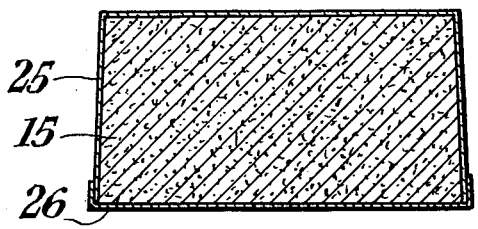
Fig. 5 is a view of a capsule employed in the lure shown in Fig. 1.

The capsule 15 is provided with a shell or container formed in two sections which are designated 25 and 26. As shown in Fig. 6, the section 25 is relatively deep while the section 26 is relatively shallow and has sides which extend over the side walls of the section 25 so that the section 26 forms a cover for the section 25. The sides of the section 26 are secured to the walls of the section 25 by a suitable waterproof adhesive so that the capsule is hermetically sealed until the walls of the capsule are punctured. The sections 25 and 26 are molded of a suitable plastic which is slightly flexible and resilient, while it is preferred that one or both of these sections be formed of transparent material so that the amount of material in the capsule can be easily observed.

Each of the end faces of the capsule 15 carry three or more small dots and a legend stating that these are to be pierced when the capsule is placed in service. The dots and the legend may be molded on the material of the sections 25 and 26, or may be applied thereto by printing or by applying a sticker or label to these sections.

The capsule 15 may contain a fish attracting substance such as a quantity of material which when moistened generates a gas which escapes through the holes in the ends of the capsule, thereby giving the lure a realistic life-like breathing appearance as it is drawn through the water. This material may comprise a mixture of sodium bicarbonate and citric acid. As an alternative to, or in addition to, the gas generating material in the capsule, the capsule may contain a felt or cotton wick coated in animal oil or other substance pleasing to fish. As the capsule is sealed until it is to be used the material within the capsule will not deteriorate prior to use, and a fisherman may carry a supply of capsules to replace those which are depleted.

The capsule 15 and the body 10 are proportioned so that the capsule 15 fits snugly in the opening in the body 10 and so that the capsule is slightly deformed when in position in the body 10. The tapered sides of the opening in the body 10 make it easy for the capsule 15 to be inserted in this opening, while the capsule is firmly gripped by the portion of the walls of the opening in the body 10 adjacent the center line of the lure. The inherent resiliency or elasticity of the material of which the section 25 of the capsule 15 is formed causes it to firmly engage the walls of the opening in the body 10 so that there is no danger that the capsule will be displaced or lost while the lure is in service, and at the same time permitting the capsule to be inserted or removed without the application of unduly large forces.

When the lure is to be used, a capsule 15 is placed in the body 10 and the dots in the exposed end faces of the capsule are pierced with a fish hook or other sharp tool. As the lure is then drawn through the water, gas bubbles escape from the capsule on each side of the lure and add to the life-like appearance of the lure and enhance its ability to attract fish. The flow of water over the holes in the exposed faces of the capsule insures that sufficient water will enter the capsule to sustain the generation of gas in the capsule and consequent emission of gas bubbles from the capsule. In addition, the flow of water over the holes in the capsule aids in the discharge of the scent or other fish attracting substance from the capsule.

The capsule being transparent can be readily inspected by the user so that it can always be determined when the active material in the capsule is exhausted and a new one can be substituted when required.

Although I have herein illustrated and described one form of improved lure embodying my invention, it should be understood that the invention is not limited to these details and that numerous changes and modifications may be made without departing from the spirit and scope of the following claims.

Having thus described my invention, what I claim is:

1. In an artificial fish lure, in combination, a body formed of substantially rigid material and having a substantially centrally located opening extending therethrough, the walls of said opening sloping towards each other from the faces of the body inwardly, a capsule having a shell formed of flexible material and adapted to be positioned in said opening and to be detachably secured therein by engagement with the walls of said opening, and a fish attracting material contained in said capsule and discharged therefrom through openings in the exposed faces of the shell of said capsule.

2. In an artificial fish lure, in combination, a body formed of substantially rigid material and having a substantially centrally located opening extending therethrough, said opening being of gradually increasing cross-sectional area from the center line of the body outwardly, a capsule positioned in said opening and detachably secured therein by engagement with the walls of said opening, and a fish attracting material contained in said capsule and discharged therefrom through openings in the exposed faces of said capsule.

3. In an artificial fish lure, in combination, a body formed of substantially rigid material and having a substantially centrally located opening extending therethrough, said opening being of gradually increasing cross-sectional area from the center line of the body outwardly, a capsule positioned in said opening and detachably secured therein by engagement with the walls of said opening, and a fish attracting material contained in said capsule and discharged therefrom through openings in the exposed faces of said capsule, said capsule having a shell formed of flexible transparent material, whereby the capsule is held in engagement with the walls of the opening in said body by the inherent resiliency of the material of which the capsule shell is formed and whereby the quantity of fish attracting material in said capsule may be visibly ascertained.

4. In an artificial fish lure, in combination, a body formed of substantially rigid material and having a substantially centrally located opening extending therethrough, said opening being of gradually increasing cross-sectional area from the center line of the body outwardly, a capsule positioned in said opening and detachably secured therein by engagement with the walls of said opening, said capsule having a shell formed of a material which is substantially impervious to moisture and which may be readily pierced by a sharp instrument, said shell being constructed in sections which are hermetically sealed together, and a fish attracting material contained in said capsule and adapted to be discharged therefrom through openings in said shell.

5. In an artificial fish lure, a body comprising a generally crescent shaped member having curved upper and lower surfaces, said body having an opening therein extending between the side walls, said opening being of gradually increasing cross-sectional area from the center line of the body outwardly and being adapted to have detachably secured therein a capsule containing a quantity of fish attracting material.

STANLEY J. MIKINA.